United States Patent
Nishide (10) Patent No.: US 9,036,202 B2
(45) Date of Patent: May 19, 2015

(54) IMAGE PROCESSING DEVICE AND IMAGE PROCESSING METHOD PERFORMING IMAGE PROCESS ACCORDING TO ATTRIBUTE INFORMATION OF IMAGE OBJECT

(75) Inventor: Yasushi Nishide, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 147 days.

(21) Appl. No.: 13/590,528

(22) Filed: Aug. 21, 2012

(65) Prior Publication Data

US 2013/0057881 A1    Mar. 7, 2013

(30) Foreign Application Priority Data

Sep. 6, 2011  (JP) .................................. 2011-194292

(51) Int. Cl.
  G06F 15/00    (2006.01)
  G06T 11/60    (2006.01)
  H04N 1/54     (2006.01)

(52) U.S. Cl.
  CPC . *G06T 11/60* (2013.01); *H04N 1/54* (2013.01)

(58) Field of Classification Search
  CPC ........................... G06K 15/02; G06K 15/1878
  USPC ......... 358/1.9, 2.1, 1.11, 1.18, 504, 518, 448, 358/453, 462
  See application file for complete search history.

(56) References Cited

U.S. PATENT DOCUMENTS

2005/0174588 A1*  8/2005  Kodama et al. ................ 358/1.9
2005/0243374 A1* 11/2005  Nishide et al. ................ 358/2.1
2009/0268251 A1* 10/2009  Nishide .......................... 358/2.1

FOREIGN PATENT DOCUMENTS

| JP | A-6-320802   | 11/1994 |
| JP | A-9-193477   | 7/1997  |
| JP | A-2009-267927 | 11/2009 |

* cited by examiner

*Primary Examiner* — Martin Mushambo
(74) *Attorney, Agent, or Firm* — Oliff PLC (57) ABSTRACT

An image processing device includes a rewriting unit that extracts attribute information of each image object from first page description language data and adds a special color space designating command including at least one color name parameter that represents the attribute information of each of the extracted image objects to rewrite the first page description language data into second page description language data; an RIP unit that interprets the second page description language data rewritten by the rewriting unit to obtain each pixel value of printing image data for a printing device; and a color converting unit that performs a color conversion process during the processing of the RIP unit, wherein the rewriting unit and the color converting unit share information on the correspondence between a color space and a combination of color name parameters for expressing the color space.

5 Claims, 6 Drawing Sheets

IMAGE PROCESSING DEVICE AND IMAGE PROCESSING METHOD PERFORMING IMAGE PROCESS ACCORDING TO ATTRIBUTE INFORMATION OF IMAGE OBJECT

CROSS-REFERENCE TO RELATED APPLICATIONS

This application is based on and claims priority under 35 USC 119 from Japanese Patent Application No. 2011-194292 filed Sep. 6, 2011.

BACKGROUND

Technical Field

The present invention relates to an image processing device and an image processing method.

SUMMARY

According to an aspect of the present invention, there is provided an image processing device including: a rewriting unit that extracts attribute information of each image object from first page description language data and adds a special color space designating command including at least one color name parameter that represents the attribute information of each of the extracted image objects to rewrite the first page description language data into second page description language data; an RIP unit that interprets the second page description language data rewritten by the rewriting unit to obtain each pixel value of printing image data for a printing device; and a color converting unit that performs a color conversion process during the processing of the RIP unit, wherein the rewriting unit and the color converting unit share information on the correspondence between a color space and a combination of color name parameters for expressing the color space.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings.

First, the terms used in this specification will be described.

"Page description language data" is data that describes a set of commands for rendering an image of at least one print target page in a page description language (PDL). Examples of the page description language include a PostScript (registered trademark) and a portable document format (PDF).

An "image object" is the unit of images included in an image of a print target page, and for example, is an image rendered according to one rendering command (for example, a paint operator such as image or fill of the PostScript (registered trademark)) of the PDL. An RIP interprets PDL data including these rendering commands and sequentially renders a raster image of these image objects on a page memory to thereby generate the raster images of the respective print target pages as the result of the interpretation.

"Attribute information" of an image object is information representing various attributes of the image object. Examples of the attributes of an image object include a color space that expresses the color of the image object and the type of the image object. Examples of the types of an image object include a line drawing, a figure, a character, an image (a continuous-tone image such as a photo). The attribute information of an image object is described in PDL data.

A "special color" which is also called a spot color is ink of special colors other than process colors (cyan (C), magenta (M), yellow (Y), and black (K)). When an image object is rendered using a special color, a color space of special colors is designated in PDL data as a color space for the image object. Examples of the color space of special colors include a "DeviceN" color space of the PostScript. A command that designates the color space of special colors includes the name of at least one color, namely a color name, used in the color space as a parameter (operand). The names of individual colors included as the parameter indicate the special colors used in the color space of special colors, respectively. In general, the RIP has a function of supplying the name parameter of at least one color to an image processing device at the subsequent stage (in particular, a color converting unit or a color matching module that performs color-space conversion or color matching).

Figure 1:
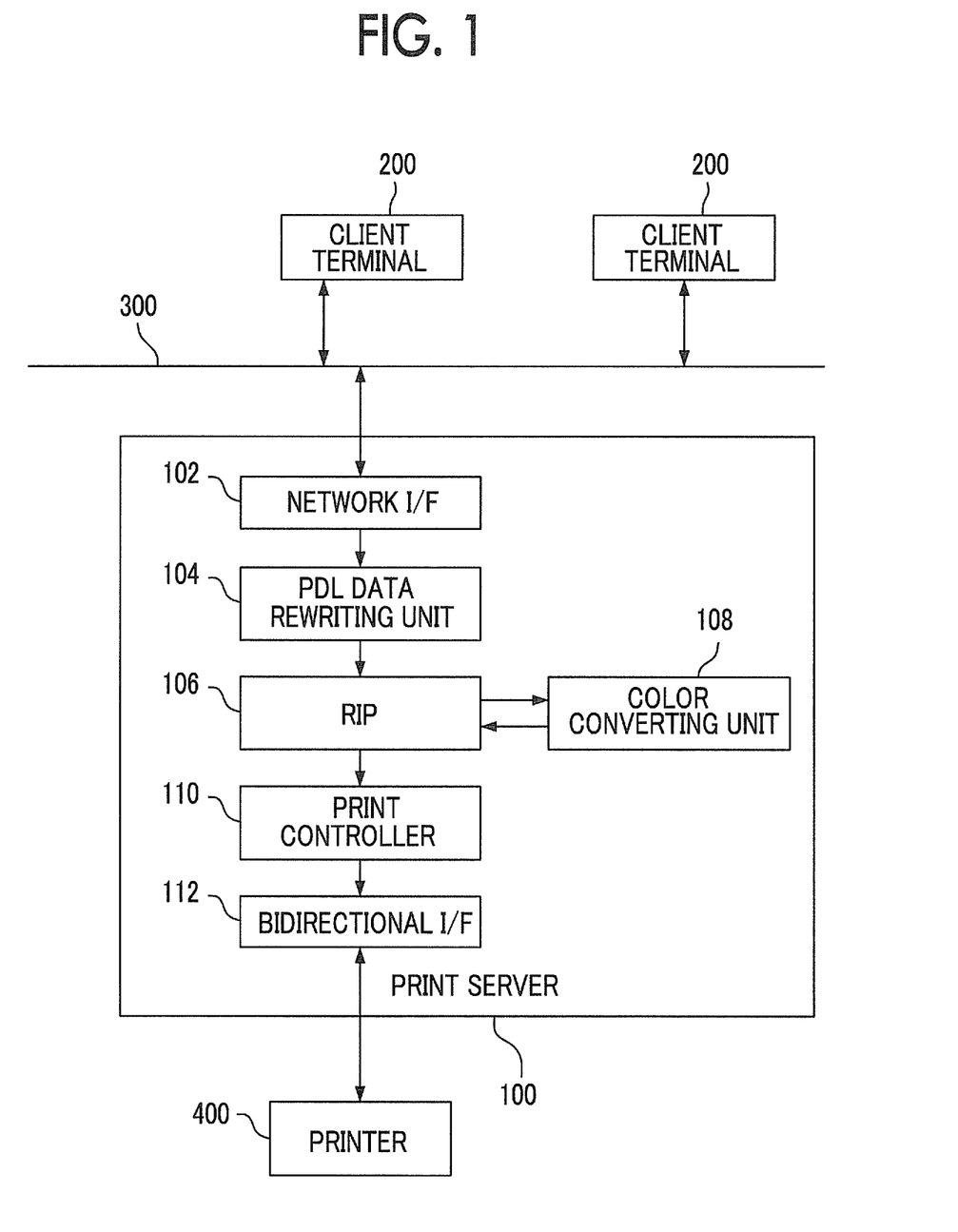
FIG. 1 is a diagram illustrating an example of a system configuration of an exemplary embodiment.

Next, an overall configuration of a system to which an exemplary embodiment of the present invention is applied will be described with reference to FIG. 1. This system includes a print server 100 and at least one client terminal 200 connected via a network 300 such as a local area network (LAN). The print server 100 is an application example of an image processing device according to the exemplary embodiment of the present invention. In the following description, an example in which the image processing device according to the exemplary embodiment of the present invention is implemented as the print server 100 will be described. However, the image processing device according to the exemplary embodiment of the present invention is not limited to this but may be implemented as various types of intermediate servers such as a file server connected to the client terminal 200 via the network 300 and may be mounted on a computer that is included in a printer.

A printer 400 that prints an image on a sheet is connected to the print server 100. The printing method used in the printer 400 is not particularly limited but may be an electrophotographic method or an ink jet method or may be another printing method. Upon receiving a print job output from the client terminal 200, the print server 100 executes a printing and outputting operation corresponding to the print job.

The print server 100 includes a network interface (network I/F) 102, and is connected to the network 300 via the network I/F 102. Moreover, the print server 100 includes a bidirectional interface (bidirectional I/F) 112, and is connected to the printer 400 via the bidirectional I/F 112. Multiple printers 400 may be connected to the print server 100, and multiple bidirectional I/Fs 112 or multiple types of bidirectional I/Fs 112 may be used.

The print server 100 may be configured, for example, by adding a control board having a predetermined function to a personal computer (PC). Moreover, the print server 100 may include an input device such as a keyboard or a mouse and a display device such as an LCD display.

The print server 100 includes a PDL data rewriting unit 104, an RIP 106, a color converting unit 108, a print controller 110 in addition to these interfaces 102 and 112.

The PDL data rewriting unit 104 performs a rewriting process according to this exemplary embodiment on page description language (PDL) data of a print job sent from the client terminal 200. In this exemplary embodiment, even when a normal RIP which does not have an extended function is used, the attribute information of individual image objects included in the PDL data is delivered to a processing unit that receives and processes pixel value data of respective pixels, which is the result of the processing of the RIP. For this reason, the PDL data rewriting unit 104 performs a process of rewriting the PDL data. An example of the rewriting process is a process of adding a special color space designating command which will be described in detail later. The processing performed by the PDL rewriting unit 104 will be described in detail later.

The RIP 106 executes RIP processing on the PDL data that is input from the client terminal 200 and is rewritten by the PDL data rewriting unit 104. That is, the RIP 106 interprets the descriptions of the PDL data and writes (rasterizes) the pixel values of respective pixels on a page memory in accordance with the interpretation result to thereby generate a raster image represented by the PDL descriptions. The RIP 106 generates raster image data of the plates of respective colorants (typically, ink or toner of the process colors C, M, Y, and K) used by the printer 400. Here, the RIP 106 may not have an extended function for delivering the attribute information of the image objects to an image processing unit at the subsequent stage.

When executing the RIP processing, the RIP 106 causes the color converting unit 108 to perform color-space conversion processing.

The color converting unit 108 performs "color-space conversion" which involves converting the pixel values of a color space designated in PDL data into the pixel values of a color space used by the printer 400 which is a target device. For example, when the color of a certain image object in PDL data is expressed in a DeviceRGB color space, the value (R, G, or B) of the color is converted into the value (C, M, Y, or K) in a DeviceCMYK color space which is the color space of the printer 400. Such a basic function of the color converting unit 108 is also called a color management module (CMM). The color-space conversion may include conversion from the color values of a CMYK color space of a printer P to the color values of a CMYK color space of another print engine Q as well as conversion between different types of color spaces such as conversion from a RGB color space to a CMYK color space.

In this exemplary embodiment, as an example, the color converting unit 108 functions as a processing unit that performs image processing corresponding to the attribute information of respective image objects. As another example, the color converting unit 108 may create tag information representing the attribute information of respective image objects so that the processing unit performs image processing corresponding to the attribute information of the respective image object using the tag information. Thus, the color converting unit 108 includes the function of performing image processing corresponding to the attribute information or the function of generating the tag information in addition to the basic color-space conversion function described above. Such an additional function will be described in detail below.

The print controller 110 is a device that controls the printer 400. The print controller 110 supplies the raster image data of the respective printing plates generated by the RIP 106 and a control signal to the printer 400 via the bidirectional I/F 112 and causes the printer 400 to execute printing in accordance with the raster image data.

Here, there is a case where the print controller 110 performs image processing on the raster image data of the respective CMYK printing plates generated by the RIP 106. An example of the image processing is tone adjustment of an image using a lookup table (LUT). The LUT is a table in which a curve (TRC: Tone Reproduction Curve) representing the tone reproduction characteristic of each of the process colors (C, M, Y, and K), of a print engine included in the printer 400 is expressed. In the LUT, a correspondence between the pixel value of an input image and the corresponding output pixel value is registered for each process color. The print controller 110 converts the values of the respective pixels of each of the raster images of the respective CMYK printing plates input from the RIP 106 in accordance with the LUT. The tone adjustment using the LUT has been performed for the purpose of correcting a temporal characteristic change with use of a print engine or realizing fine tone adjustment that cannot be absorbed by the color-space conversion of the color converting unit 108. For example, a user corrects the tone reproduction curve of the LUT via a user interface of the print server 100 by checking a test printout output by the printer 400 so that desired tone reproduction is realized. Moreover, another example of the image processing performed by the print controller 110 is halftone screening. Moreover, the print controller 110 may execute K100 processing described later.

Hereinabove, the overview of the print server 100 has been described. The print server 100 may perform process queue management which involves storing input print jobs (PDL data) in a processing waiting queue, sequentially reading the print jobs stored in the processing waiting queue, and executing image processing such as RIP. Moreover, the print server 100 may perform print queue management which involves storing raster data obtained by RIP or the like in a print queue and sequentially outputting the raster data from the print queue to the printer 400. Further, the print server 100 may perform holding queue management which involves storing and holding a print job, of which print settings are not designated and a print job, of the print setting cannot be executed, in a holding queue. These queue management processes are known, and further description will not be provided in this specification.

Figure 2:
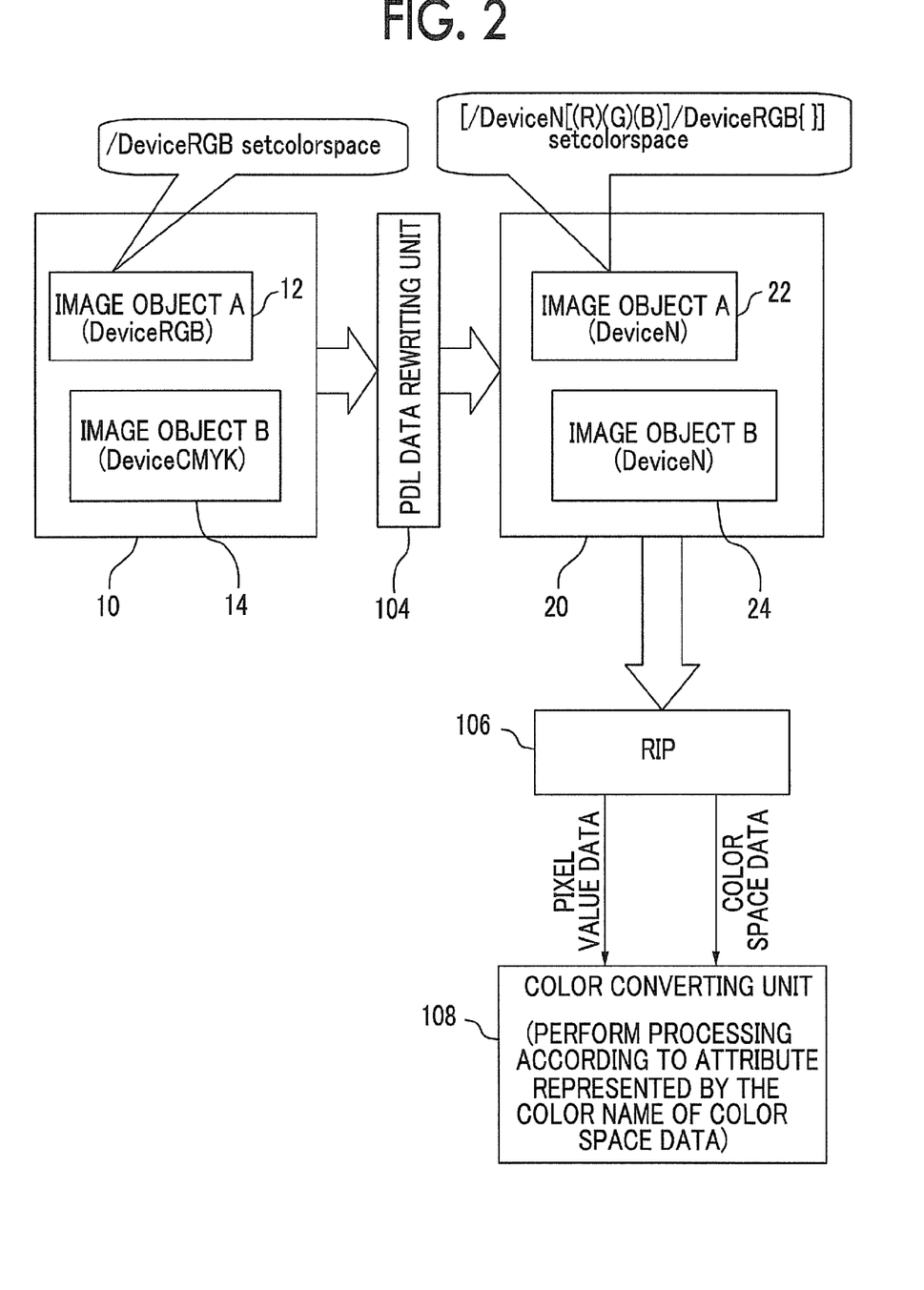
FIG. 2 is a diagram for explaining an overview of the processing in one example of the exemplary embodiment.

Next, an overview of the processing in one exemplary embodiment will be described with reference to FIG. 2. In this exemplary embodiment, the attribute information of individual image objects included in PDL data is included in a command (operator) that designates a color space of special colors. In this way, even when a normal RIP that does not have an extended function is used, the RIP delivers the attribute information of the image objects to the processing unit that receives and processes the pixel value data of the respective pixels, which are the processing results of the RIP. In the example of FIG. 2, the color converting unit 108 that executes color-space conversion processing is illustrated as an example of the image processing unit.

In the example of FIG. 2, for the attribute information of the image object to be delivered to the color converting unit 108 via the RIP 106, the PDL rewriting unit 104 rewrites PDL data 10 representing a print target image to generate PDL data 20. Moreover, in FIG. 2, a color space attribute representing the color space for expressing the color of an image object is illustrated as an example of the attribute information of the image object delivered to the color converting unit 108 via the RIP 106.

In the example illustrated in FIG. 2, in the PDL data 10 which is a print target, two image objects A12 and B14 are included in one page, and the color spaces applied to the respective image objects A12 and B14 are different. That is, the color space of the image object A12 is "DeviceRGB," and the color space of the image object B14" is "DeviceCMYK". The "DeviceRGB" and "DeviceCMYK" are an example of the name of a color space used in PostScript or PDF. The former represents a color space which is expressed by a combination of the three primary colors of red (R), green (G), and blue (B) used in a display device. The latter represents a color space which is expressed by a combination of the four primary colors of C, M, Y, and K used in printing. For example, when the PostScript (registered trademark) is used as the PDL, in the PDL data 10, a description "/DeviceRGB setcolorspace" for designating the color space of the image object A12 is disposed before the PostScript description representing the image object A12. A description for designating other color space is not included between this color space designating description and the description of the image object A12.

The PDL rewriting unit 104 extracts the attribute information of the respective image objects A12 and B14 from the PDL data 10. Moreover, the PDL rewriting unit 104 generates a special color space designating command, in which the extracted attribute information of the corresponding image object is included as a color name parameter, with respect to each of the image objects A12 and B14 and adds the generated special color space designating command to the PDL data 10 as a command that designates the color space of the corresponding image object. By the rewriting including adding of a command, the PDL data 20 is generated.

In the example of FIG. 2, for example, the PDL rewriting unit 104 extracts "DeviceRGB" from the command description "/DeviceRGB setcolorspace" for designating the color space of the image object A12 as the color space attribute of the image object A12. Subsequently, the PDL rewriting unit 104 generates a special color space designating command "[/DeviceN ((R) (G) (B)]/DeviceRGB { }] setcolorspace" including a combination of color name parameters representing the color space attribute "DeviceRGE," namely a combination of "(R)," "(G)," and "(B)".

In this example, the source color space "DeviceRGB" is expressed using a combination of the three special colors "(R)," "(G)," and "(B)" of the special color space (in this example, a DeviceN color space). Here, the reason why the color space made up of three special colors is used as the special color space is because the source color space "DeviceRGB" is expressed by a combination of the three primary colors R, G, and B. That is, the colors (of the respective pixels) of the image object A12 in the PDL data 10 are expressed by a combination of the component values of the three primary colors R, G, and B of the source color space "DeviceRGB". Here, if the color of the image object A12 is expressed by a combination of two or smaller or four or more special colors, the number (2 or smaller or 4 or more) of special colors constituting the special color space does not match with the designation of color according to the combination of three primary color components in the subsequent description of the image object A12. The RIP 106 may recognize such a mismatch as an error such as a grammatical error. In order to prevent such an error, it might be necessary to rewrite a color designating command (for example, setcolor in the PostScript) in the image object A12 in accordance with the number of special colors. However, this exemplary embodiment employs a method of making the number of special colors constituting the special color space identical to the number of primary colors of the source color space as a simpler method for preventing such an error. In this method, it is not necessary to rewrite the color designating command in the image object A12. In this case, the RIP 106 continues its processing by interpreting the values of the respective color components of the color designating command of the image object A12 as the respective values of the three special colors represented by the color names of "R," "G," and "B". When the source color space like "DeviceCMYK" is expressed by a combination of four primary colors, the generated special color space designating command may include four color name parameters.

In the example of FIG. 2, although the information representing the source color space "DeviceRGB" is separated into three color name parameters "(R)," "(G)," and "(B)" of the special color space, this is only an example. Instead of this, a predetermined one color name parameter of the three color name parameters may represent the source color space, and the remaining two color name parameters may be dummy color name parameters. In this case, the special color space designating command including the color space attribute of the image object A12 becomes "[/DeviceN [(RGB) (Dummy1) (Dummy2)] /DeviceRGB { }] setcolorspace," for example. In this example, the first color name parameter "(RGB)" represents the source color space DeviceRGB, and the second and third color name parameters "(Dummy1)" and (Dummy2)" are dummies for making the number of colors of the special color space identical to the number of primary colors of the source color space. Moreover, a combination of predetermined two color name parameters of the three color name parameters may represent the source color space, and the remaining one color name parameter may be a dummy color name parameter. In general, when the source color space is expressed by a combination of N primary colors (where N is an integer of 1 or more), a command that takes N color name parameters may be generated as the special color space designating command, and the source color space may be expressed by a combination of predetermined one to N parameters among the N color name parameters.

More specifically, the third and fourth operands "/DeviceRGB" and "{ }" within the special color space designating command "[/DeviceN [(R) (G) (B)] /DeviceRGB { }]setcolorspace" are an alternative color space (alternativeSpace) used when it is not possible to perform color decomposition according to the designated special color space "/DeviceN [(R) (G) (B)]" and a method (tintTransform) for converting the component values of the three special colors into the color components of the substitute color space, respectively. In this example, DeviceRGB which is the same as the source color space is designated as alternativeSpace. Moreover, although an example of the description of tintTransform is not provided, the respective components of the special colors "(R)," "(G)," and "(B)" of the DeviceN color space may be converted into the respective components of the primary colors R, G, and B of the DeviceRGB color space as they are.

Here, in this exemplary embodiment, the PDL rewriting unit 104 adds a special color space designating command including a combination of color name parameters which may definitely be recognized by the color converting unit 108.

That is, the combination of color name parameters to be used for expressing individual color spaces is determined by the PDL rewriting unit 104 and the color converting unit 108. Thus, for example, the PDL rewriting unit 104 and the color converting unit 108 have the shared information in advance that the combination of three color name parameters "(R)," "(G)," and "(B)" represents a color space "DeviceRGB". For example, the PDL rewriting unit 104 has information on the correspondence between each color space and a combination of color name parameters representing the color space as the common knowledge with the color converting unit 108. For this reason, when the PDL rewriting unit 104 designates a DeviceN color space including the combination "[(R) (G) (B)]" of three color name parameters, the color converting unit 108 understands that the DeviceN color space may be interpreted as a DeviceRGB color space. Thus, in the system of this exemplary embodiment, it is ensured that the special color space "/DeviceN [(R) (G) (B)]" may definitely be color-decomposed (that is, the color converting unit 108 may perform color conversion so that printing may be performed by a print engine at the subsequent stage), and the operands alternativeSpace and tintTransform are not used. Therefore, alternativeSpace and tintTransform may be predetermined dummy data, for example. However, as in the example of FIG. 2, if the source color space DeviceRGB is designated as alternativeSpace, and a conversion method of converting respective components of the special colors "(R)," "(G)," and "(B)" of the DeviceN color space into respective components of the primary colors R, G, and B of the DeviceRGB as they are is designated as tintTransform, the special color space designating command being added may be processed by a printing system which does not include the PDL rewriting unit 104 and the color converting unit 108 according to this exemplary embodiment.

Hereinabove, the special color space designating command generated by the PDL rewriting unit 104 has been described in detail. Subsequently, the PDL rewriting unit 104 adds the generated special color space designating command "[/DeviceN [(R) (G) (B)] /DeviceRGB { }] setcolorspace" to the PDL data 10 as a command that designates the color space of the image object A12.

The "adding" may be realized by deleting a source color space designating command "/DeviceRGB setcolorspace" for the image object A12 from the PDL data 10 and adding a special color space designating command to the PDL data 10. In other words, this is the same as rewriting the source color space designating command into the special color space designating command.

Moreover, as another example of the "adding," the special color space designating command may be added between the source color space designating command "/DeviceRGB setcolorspace" and the description of the image object A12. In this case, the RIP 106 interprets the special color space designating command described at a position closer to the description of the image object A12 as a command that designates the color space of the image object A12.

As for the image object B14, the PDL rewriting unit 104 adds "[/DeviceN [(C)(M)(Y) (K)] /DeviceCMYK { }] setcolorspace," for example, to the PDL data 10 as the special color space designating command.

As above, when the PDL rewriting unit 104 adds the special color space designating command, in which the attribute information of the object is included as a color name parameter, to the PDL data 10 with respect to each of the image objects A12, the PDL data 10 is rewritten into the PDL data 20. The color spaces of the image objects A22 and B24 included in the PDL data 20 after rewriting are DeviceN which is the special color space. However, portions other than the color space designation within the PDL description of the image objects A22 and B24 may be the same as those of the PDL description of the image objects A12 and B14 before rewriting.

In the system of this exemplary embodiment, the PDL data 20 after rewriting generated in this way is input to the RIP 106.

The RIP 106 interprets the input PDL data 20 sequentially from the start and renders (rasterizes) respective pages on a page memory based on the interpretation result. The rendering process may be regarded as a process of calculating the pixel values (that is, a combination of the values of respective color components) of the respective pixels on a page. The RIP 106 interprets the color space of the image object A22 as the DeviceN color space expressed by the three special colors "(R)," "(G)," and "(B)" and interprets the three color components representing the color of the image object A22 as the special color components of these three special colors. Similarly, the RIP 106 interprets the color space of the image object B24 as the DeviceN color space expressed by four special colors "(C)," "(M)," "(Y)," and "(K)," and interprets the four color components representing the color of the image object B24 as the special color components of these four special colors. The RIP 106 may not know which colorant (ink or toner of respective colors) will the three special colors "(R)," "(G)," and "(B)" actually correspond to. The RIP 106 just performs the rasterizing process so that the color values (pixel values) of the respective pixels of an image object are represented by a combination of component values of the respective colors under the assumption that there are colors (special colors) having such names.

During the interpretation and rasterizing processes, the RIP 106 causes the color converting unit 108 to perform color-space conversion on the pixel values of the respective pixels.

In order to instruct the color converting unit 108 to perform color-space conversion, the RIP 106 delivers color space data to the color converting unit 108 for each pixel or whenever a color space designating command is discovered from the interpreted PDL data 20. The color space data is data that defines a color space representing the colors of a group of pixels that the RIP 106 is going to deliver the color converting unit 108 from now on or the colors of pixels delivered at the same time as the color space data. The color space data includes the type of a color space (for example, any one of DeviceRGB, DeviceCMYK, and DeviceN) and if present, a parameter of the color space (for example, a list of color names in a DeviceN color space). The color converting unit 108 recognizes the color space, in which the respective pixel values delivered from the RIP 106 represent the colors, from the color space data. For example, when the color space data represents DeviceRGB, the color converting unit 108 recognizes that the pixel values delivered from the RIP 106 represent the colors of DeviceRGB and converts the pixel values into pixel values (for example, pixel values of DeviceCMYK) represented by a combination of colorants possessed by a print engine at the subsequent stage.

The color converting unit 108 of this exemplary embodiment has an additional function described below in addition to the normal color converting function. That is, this additional function is a function of recognizing the attribute information (for example, a color space) of an image object from the parameters of a special color space and executing image processing corresponding to the recognized attribute information when the type of a color space represented by the color space data is a specific special color space (for example, DeviceN).

For example, when the color space data delivered from the RIP 106 includes DeviceN as the type of a color space, the color converting unit 108 examines the color name parameter included in the color space data. As a result, when it is determined that the color name parameter is a combination of "(R)," "(G)," and "(B)", the color converting unit 108 recognizes that the color space attribute of the image object corresponding to the color space data is DeviceRGB. Moreover, the color converting unit 108 performs image processing corresponding to the color space attribute of DeviceRGB on the values of the respective pixels received from the RIP 106.

In order to recognize a color space from the color name parameter of the special color space designating command, the color converting unit 108 may have the information on a combination of color names representing each color space.

An example of the image processing executed by the color converting unit 108 according to the recognized attribute information of the image object is color-space conversion. For example, when the color space attribute of an image object, represented by the color space data received from the RIP 106 is DeviceRGB, the color converting unit 108 interprets the pixel values input from the RIP 106 in correspondence to the color space data as the value in the DeviceRGB color space and converts the pixel values into the pixel values of DeviceCMYK which is the color space of a print engine at the subsequent stage. This conversion may be executed according to a well-known conversion method which uses a lookup table or the like.

When the color space data delivered from the RIP 106 represents a color space (for example, DeviceRGB) other than the special color space (DeviceN), the color converting unit 108 may perform normal color-space conversion processing. Moreover, even when the color space data delivered from the RIP 106 represents a special color space (DeviceN), if the color name parameter included in the color space data is different from the combination of color names corresponding to the color space, which is the common arrangement of the PDL rewriting unit 104, the color converting unit 108 may perform normal color-space conversion processing.

The pixel values obtained as the result of the image processing executed by the color converting unit 108 are returned to the RIP 106. The RIP 106 outputs the pixel values returned from the color converting unit 108 to a processing unit at the subsequent stage.

The example of FIG. 2 is a case where the attribute information of the image object delivered to the color converting unit 108 is the color space attribute. Next, an example in which the type of an image object is delivered to the color converting unit 108 as the attribute information of the image object will be described with reference to FIG. 3.

Figure 3:
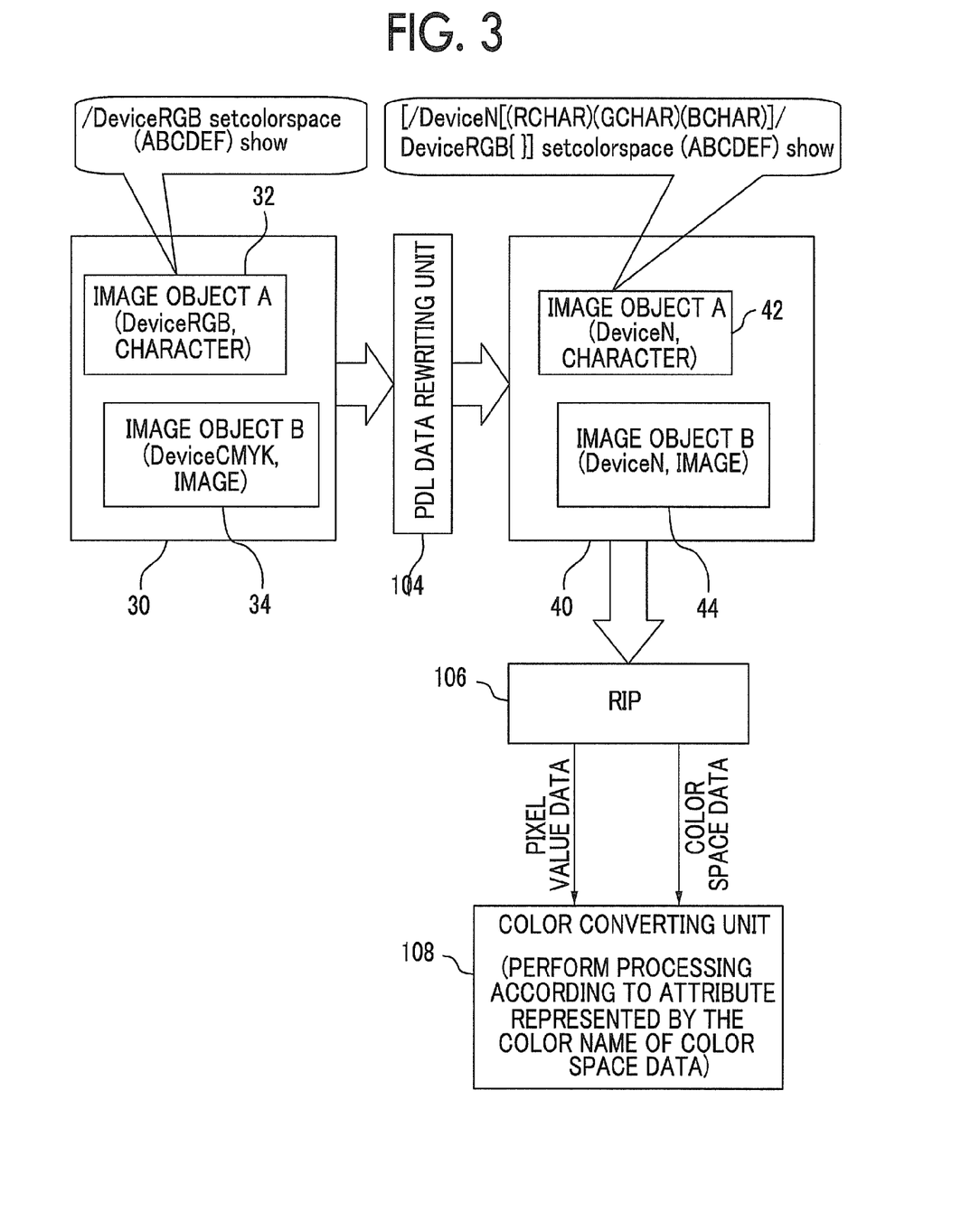
FIG. 3 is a diagram for explaining another overview of the processing in another example of the exemplary embodiment.

In the example of FIG. 3, similarly to the example of FIG. 2, the special color space designating command is used in order to deliver the type of an image object to the color converting unit 108.

In the example of FIG. 3, in the PDL data which is a print target, two image objects A32 and B34 are included in one page 30. The color space of the image object A32 is "DeviceRGB," and the object type thereof is "character". Moreover, the color space of the image object B34 is "DeviceCMYK," and the object type thereof is "image (photo)".

For example, when the PostScript (registered trademark) is used as the PDL, in the PDL data 30, a description "/DeviceRGB setcolorspace" for designating the color space of the image object A32 is disposed before the PostScript description representing the image object A32, and a description "(ABCDEF) show" is disposed after the description "/DeviceRGB setcolorspace" (without interposing a description for designating another color space). Here, "show" is an operator that instructs to paint (render) a character string on a page, and "(ABCDEF)" before the operator is a character string which is an operand of the show operator. The RIP 106 having interpreted the description "(ABCDEF) show" writes a character string "ABCDEF" onto a page memory. In order to focus on the key points, in the example of FIG. 3, a PDL description for designating the color or the rendering position of the character string is not provided.

The PDL rewriting unit 104 extracts the attribute information of the respective image object A32 and B34 from the PDL data 30.

For example, the PDL rewriting unit 104 recognizes that the color space of the image object A32 is "DeviceRGB" from the command description "/DeviceRGB setcolorspace" for designating the color space of the image object A32 and recognizes that the type of the image object A32 is "character" from the fact that the command (operator) that instructs rendering of the image object A32 is "show". Subsequently, the PDL rewriting unit 104 generates a special color space designating command "/DeviceN [(RCHAR) (GCHAR) (BCHAR)] /DeviceRGB { }] setcolorspace" including a color name parameter representing a combination of the recognized color space attribute "DeviceRGB" and an object type attribute "character," namely a combination of three color names of "(RCHAR)," "(GCHAR)," and "(BCHAR)" (see PDL data 40 after rewriting in FIG. 3). That is, information on a correspondence that a combination of the attributes of the color space attribute "DeviceRGB" and the object type attribute "character" is represented by a combination of the three color names "(RCHAR)," "(GCHAR)," and "(BCHAR)" is registered in the PDL rewriting unit 104 (and the color converting unit 108). The PDL rewriting unit 104 generates the color name parameter corresponding to the attribute information of the image object A32 in accordance with the correspondence information.

Moreover, a generation rule for generating a combination of color names from the combination of the color space attribute and the object type attribute may be stored in the PDL rewriting unit 104 instead of the information on the correspondence between the combination of the color space attribute and the object type attribute and the corresponding combination of the color names. For example, a generation rule may be used in which color names are generated by the same number as the number of primary color components of the color space represented by the color space attribute, the characters (for example, "R," "G," and "B") representing the corresponding primary color components are disposed at the start of the respective color names, and a character string (for example, "CHAR") representing the object type is connected to the end of the characteristics. The combination of three color names of "(RCHAR)," "(GCHAR)," and "(BCHAR)" is based on this rule.

The combination of "(RCHAR)," "(GCHAR)," and "(BCHAR)" illustrated in FIG. 3 is only an example. For example, instead of this, the combination of the color space attribute "DeviceRGB" and the object type attribute "character" may be expressed by a combination of three color names of "(RGB)," "(CHAR)," and "(Dummy)". In this example, the color name at the start of the combination of color names included in the color name parameter represents the color space attribute of the image object, and the next color name represents the type of the image object. The remaining color name is a color name which is arranged both with the PDL rewriting unit 104 and the color converting unit 108 so as to be recognized as a dummy. Naturally, such a combination method is only an example.

Moreover, the PDL rewriting unit 104 recognizes that the color space of the image object B34 is "DeviceCMYK" from the command description "/DeviceCMYK setcolorspace" for designating the color space of the image object B34 and recognizes that the type of the image object B34 is "image" from the fact that the operator that instructs rendering of the image object B34 is "image". Subsequently, the PDL rewriting unit 104 generates a special color space designating command "[/DeviceN [(CIMAGE)(MIMAGE)(YIMAGE)(KIMAGE)] /DeviceCMYK { }] setcolorspace" including a color name parameter representing a combination of the recognized color space attribute "DeviceCMYK" and the object type attribute "image," namely a combination of four color names of "(CIMAGE)," "(MIMAGE)," "(YIMAGE)," and "(KIMAGE)".

The PDL rewriting unit 104 "adds" the generated special color space designating command to the source PDL data 10. Similarly to the case of FIG. 2, the "adding" herein may be realized by rewriting the source color space designating command into the generated special color space designating command and may be realized by adding the generated special color space designating command between the source color space designating command and the PDL description of the image object. However, there is a case where descriptions of multiple image objects continue after one color space designating command (that is, these multiple image objects are expressed by color spaces designated by the commands thereof). In this case, as for objects which appear the second and later in the PDL data 10 among these multiple image objects, a special color space designating command representing a color space attribute represented by the color space designating command and the type attribute of the object is added before the PDL description of the object.

By the rewriting process of adding such a special color space designating command, the PDL data 40 after rewriting is generated. The color spaces of the image objects A42 and B44 included in the PDL data 40 after rewriting are DeviceN.

The RIP 106 interprets and rasterizes the PDL data 40 after rewriting. Moreover, the RIP 106 sends a request to the color converting unit 108 to perform color-space conversion on the respective pixels which are the rasterization results. In this request, the RIP 106 delivers the color space data and the pixel value data to the color converting unit 108 similarly to the example of FIG. 2. The color space data of the image object corresponding to the special color space designating command added by the PDL rewriting unit 104 includes information representing the special color space (DeviceN) and the color name parameter representing the color space of the image object and the object type.

When the color space data received from the RIP 106 designates a special color space, the color converting unit 108 obtains the color space attribute of the image object and the object attribute from the color name parameter included in the color space data. For example, since information representing the combination of three color names of "(RCHAR)," "(GCHAR)," and "(BCHAR)" is included in the color space data corresponding to the image object A42, the attribute information representing that the color space attribute is "DeviceRGB" and the object type attribute is "character" is obtained from the information. Moreover, the color converting unit 108 executes image processing corresponding to the obtained attribute information with respect to the pixel value data received from the RIP 106.

The image processing includes color-space conversion from the color space represented by the color space attribute obtained from the color space data into the color space of a print engine at the subsequent stage. Moreover, the image processing may include image processing corresponding to the object type attribute obtained from the color space data.

An example of the image processing corresponding to the object type attribute includes sharpness (or edge enhancement) processing when the type of the image object is "image (photo)," for example. That is, when the object type of an image object is "image," the color converting unit 108 executes sharpness processing using the pixel values of the respective pixels input from the RIP 106. Since the sharpness processing does not change resolution of an image, the sharpness process matches with pixel-based processing performed by the color converting unit 108, which involves returning the pixel values as the result of color-space conversion in response to the request for pixel-based color-space conversion from the RIP 106. Thus, a sharpness processing function is added to the color converting unit 108, and when the attribute information included in the color space data received from the RIP 106 represents an image object of "image," the color converting unit 108 executes sharpness processing on the pixel values of a group of pixels belonging to the image object. The sharpness processing may be performed on the pixel values before color-space conversion or the pixel values after color-space conversion.

Another example of the image processing corresponding to the object type attribute is color correction corresponding to the type of the image object. In this example, when an image object corresponds to a specific one or more type, the color converting unit 108 performs color correction unique to the type (for example, application of a tone reproduction curve unique to the type) in addition to normal color-space conversion.

Moreover, the image processing corresponding to the attribute information of the image object, performed by the color converting unit 108 may include image processing corresponding to the combination of the color space attribute and the object type attribute.

An example of the image processing corresponding to this combination is processing of performing different color correction depending on the combination of the color space and the type of the image object.

As another example of the image processing, special color-space conversion is known in which when the pixels R, G, and B in a "character"-series image object have the same value, the values of the pixels are expressed by the density of K1 color (in this case, C=M=Y=0). This image processing will be described.

Although an image object belonging to the type of character series ("character," "line drawing," or "figure") is often expressed by black or gray, the color of such an image object has the same R, G, B component values in an RGB-series color space such as DeviceRGB. In normal color-space conversion from RGB to CMYK, black or gray is expressed by a combination of C, M, Y, and K and thus has C, M, and Y components which are not 0. However, a sharper image is obtained when black or gray is expressed by a plain K color (C=M=Y=0). In a black or gray character-series image object, the contrast with the background color is important. Thus, the pixel values of such an object are converted into the density value of the plain K color.

This image processing is applied to pixels satisfying a condition that the color space attribute is RGB-series, the object type attribute is character-series, and the pixel values are R=G=B. As for the pixels satisfying such a condition, a special conversion rule that converts the RGB values into the density value of the plain K color is applied instead of the LUT of normal color-space conversion.

Another example of the image processing corresponding to the object type attribute and the image processing corresponding to the combination of the color space attribute and the object type attribute is generation of tag plates. A tag plate is raster image data of a plate different from the respective color plates of CMYK and is used for controlling the image processing at the subsequent stage (for example, the image processing in the print controller 110). The resolution of the tag plate is the same as that of the printing plates of CMYK.

For example, during the halftone screening processing in the print controller 110 at the subsequent stage, there is a case where the quality of a printing result is improved by applying different halftone screening depending on the type of an image object. For example, it is known that a relatively low screening frequency (a relatively small number of screening lines) is suitable when expressing a continuous-tone image such as a photo in a smooth gradation, and a relatively high screening frequency (a relatively large number of screening lines) is suitable when improving reproducibility of fine lines such as characteristics or line drawings. Therefore, a method has been performed in which screening with a small number of lines is applied to photo-series objects within one page of image, and screening with a large number of lines is applied to character-series objects. For example, in order to control such halftone screening processing, the color converting unit 108 generates raster image data of a tag plate indicating whether individual image objects are "images (photos)" or the others (characteristics). In this example, the raster image data of the tag plate generated by the color converting unit 108 is a 2-valued image in which the pixels belonging to an "image" object within a page have a value of "1," for example, and the pixels belonging to a type of object other than "image" have a value of "0".

The color converting unit 108 returns the image of the tag plate generated in this way to the RIP 106 together with the images of the respective CMYK printing plates which are the result of color-space conversion. The RIP 106 delivers the images of the respective printing plates to the print controller 110. When performing halftone screening processing on the images of the respective CMYK printing plates, the print controller 110 performs control such that screening with a small number of lines is applied to pixels of which the pixel value of the tag plate are "1," and screening with a large number of lines is applied to pixels of which the pixel value is "0".

In this example, although different processing is performed depending on whether the object type attribute expressed by the tag plate is "image" or the other, this is only an example. The object type attribute expressed by the tag plate may be classified depending on the purpose of image processing at the subsequent stage. The pixel of the tag plate may have a bit width of 2 or more, so that three or more classifications may be expressed.

As an example of processing that generates a tag plate corresponding to a combination of the color space attribute and the object type attribute, so-called "K100" processing is known.

Here, "K100" is so-called "solid black," which is a color having a K density of 100% and C, M, and Y densities of 0% in a CMYK space. For example, some print engines of the recent years have a function of printing an image object expressed by K100 so that the resolution of the object on the K plate is higher than the resolutions on the C, M, and Y plates in order to express characteristics and line drawings finely. Such a function will be referred to as "K100 processing". Because texts and line drawings for design are often expressed by K100, printing the same finely greatly contributes to improvement of print quality.

In order to realize the K100 processing, the color converting unit 108 examines the values of pixels when the color space attribute represented by the color space data is CMYK-series, and the object type attribute is character-series. When the value of the pixel is K=100% (and C=M=Y=0), the value of the pixel in the raster image of the tag plate is set to a predetermined value (for example, "1"). On the other hand, when any one of the conditions of CMYK-series, character-series, and K=100% is not satisfied, the value of the pixel in the raster image of the tag plate is set to a predetermined different value (for example, "0").

Upon receiving the tag plate generated in this way via the RIP 106 together with the respective CMYK printing plates, the print controller 110 provides a high-resolution image of the K plate (that is, an image of which the pixels are expressed more finely) to the printer 400 with respect to pixels of which the pixel value of the tag plate is "1," namely the "K100" pixels, and instructs the printer 400 to output a high-resolution image of the K plate. On the other hand, with respect to pixels of which the pixel value of the tag plate is "0," namely the pixels of colors other than "K100," the print controller 110 instructs the printer 400 so as to output the values of the pixels of the respective CMYK printing plates with a normal resolution.

Although the same tag plate is generated in the system of JP-A-2009-267927, in the system of JP-A-2009-267927, a function of recognizing the type of an image object and sending the recognition result to the color converting unit (CMM) is added to the RIP unit in order to generate a tag plate. In contrast, in this exemplary embodiment, by adding the attribute information such as the type of an image object to the PDL data as a special color space designating command including the attribute information in its parameter, the attribute information is delivered to the color converting unit 108 by the normal function of the RIP 106, of sending the color space data to the color converting unit 108. As above, in this exemplary embodiment, even when the normal RIP 106 which does not have an extended function is used, the attribute information of the image object is delivered to the color converting unit 108.

Figure 4:
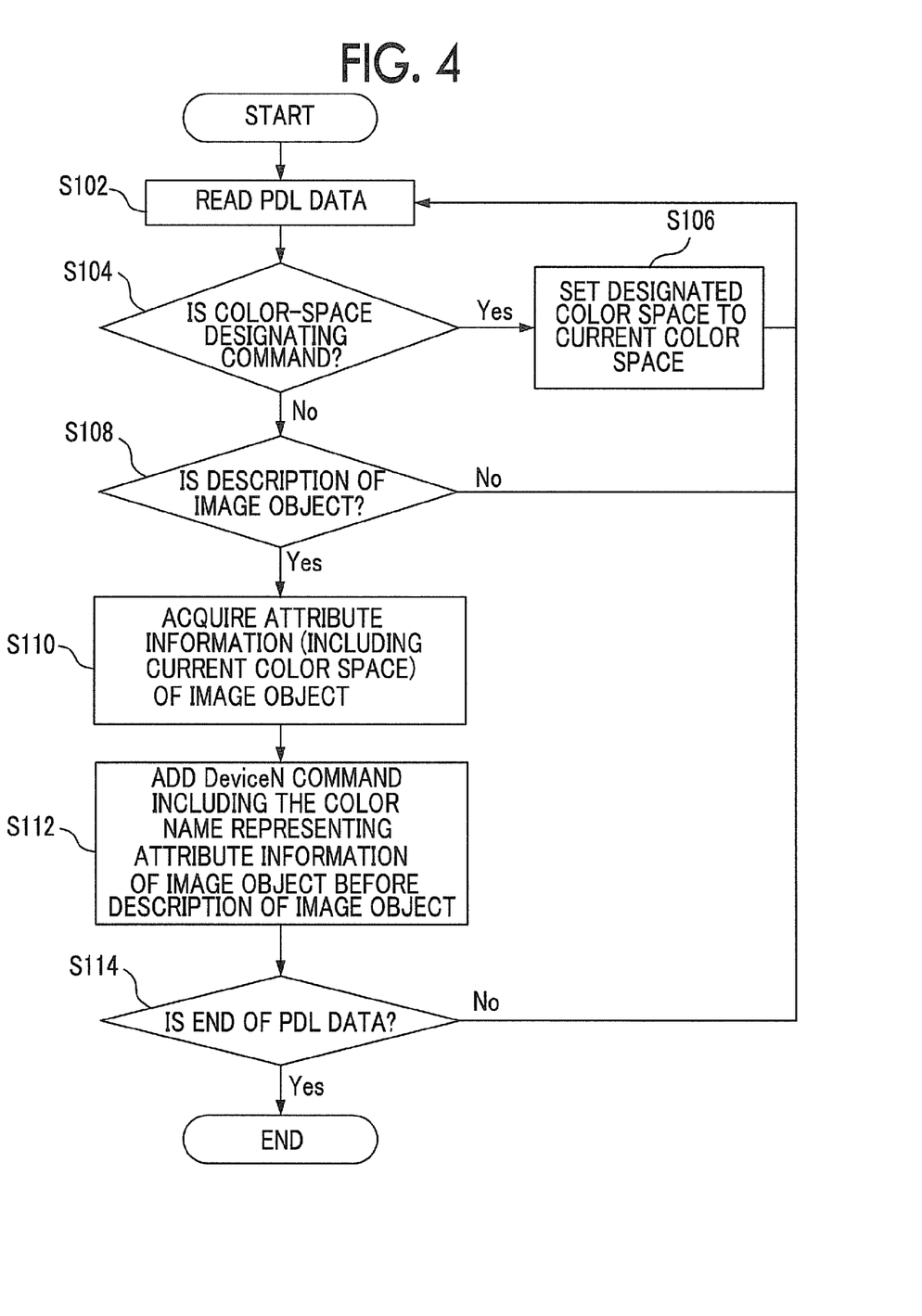
FIG. 4 is a diagram illustrating an example of the flow of the processing of a PDL rewriting unit in the exemplary embodiment.

Next, an example of the flow of the processing of the PDL rewriting unit 104 and the color converting unit 108 in this exemplary embodiment will be described with reference to FIGS. 4 and 5.

First, an example of the flow of the processing of the PDL rewriting unit 104 will be described with reference to FIG. 4.

In this flow, the PDL rewriting unit 104 sequentially reads the PDL data 10 received from the client terminal 200 from the start (S102) and recognizes a command (an operator and the parameter (operand) thereof) appearing in the PDL data 10. Subsequently, it is determined whether the recognized command is a color space designating command (for example, "setcolorspace") (S104). When the recognized command is determined to be a color space designating command, a color space designated by the command is stored as a current color space (S106). When the recognized command is a command that designates a color space and a color value like "setcmykcolor" in PostScript at the same time, the determination result in step S104 becomes "Yes," and a color space designated by the command is stored as the current color space in step S106.

When the recognized command is not a color space designating command, it is determined whether the command is a command (for example, show, fill, stroke, or image in PostScript) that instructs rendering of an image object (S108). When the determination result is "No," the flow returns to S102, and PDL data is read.

When it is determined in step S108 that the recognized command is a rendering command of an image object, the PDL rewriting unit 104 acquires the attribute information of the image object (S110). In one example, the acquired attribute information is a color space attribute representing the current color space. Moreover, the type of the image object may be determined from the rendering command, and the type may be acquired as the object type attribute.

Moreover, the PDL rewriting unit 104 generates a DeviceN color space designating command in which the acquired attribute information is included as a color name parameter, and the description of this command is added to the PDL data 10 (S112). The DeviceN color space designating command may be added right before the description (a combination of the rendering command and the description of an operand disposed before the rendering command) of the image object in the PDL data 10.

After step S112, the PDL rewriting unit 104 determines whether processing of the PDL data 10 has been completed up to its end (S114). When the processing has not been completed, the flow proceeds to step S102, and the PDL data 10 is read. When the processing has been completed, this processing flow ends. By this processing flow, the rewritten PDL data 20 is generated.

Next, an example of the flow of the processing of the color converting unit 108 will be described with reference to FIG. 5. In the processing flow of this example, the RIP 106 sends the color space data to the color converting unit 108 whenever a color space designating command is discovered from the PDL data 20.

Whenever data is acquired from the RIP 106 (S202), the color converting unit 108 determines whether the data is ending data indicating the end of a print job (S204). When the data is not ending data, it is determined whether the data is color space data that designates a special color space (S206). When the data is a color space data that designates a special color space, the color converting unit 108 recognizes the attribute information of the image object from the information on the combination of color names included in the color space data (S208). Moreover, the color space attribute within the recognized attribute information is stored as information representing the current color space (S210), an image processing mode corresponding to the attribute information is set as the current mode (S212). Examples of the image processing mode include a mode where the above-described sharpness processing is performed, a mode where color-space conversion of converting a pixel value of R=G=B into a density value of the plain K color is performed, a mode where the K100 processing is performed, a mode where a pixel value of "1" is written to a tag plate, and a mode where a pixel value of "0" is written to a tag plate. Among these image processing modes, an image processing mode corresponding to the attribute information represented by the color space data is set as the current mode representing the current processing mode.

Here, in the PDL data 20, since the special color space designating command represents the attribute information of the subsequent image object, the data of the respective pixel values subsequent to the special color space data delivered from the RIP 106 to the color converting unit 108 is data of the pixel values of an image object having an attribute that the special color space designating command indicates. Thus, these pixel value data may be subjected to the image processing corresponding to the current mode.

When it is determined in step S206 that the data acquired in step S202 is not the color space data representing a special color space, the color converting unit 108 determines whether the data is pixel value data (S214). When the data is the pixel value data, the pixel values represented by the data in the current color space are converted into the corresponding pixel values in a color space of the printer 400, and the image processing corresponding to the current mode is executed (S216) For example, when the current mode is a sharpness processing mode, the color converting unit 108 performs color-space conversion on the respective input pixel value data, for example, and stores the converted pixel value data in a memory. After that, the color converting unit 108 performs sharpness processing by applying a filter or a mask and returns the data of the respective pixel values obtained as the result of the processing to the RIP 106.

When it is determined in step S214 that the data acquired in step S202 is not the pixel value data, it means that the data is normal color space data rather than the special color space data representing the attribute information of the image object. In this case, the color converting unit 108 may execute normal color-space conversion according to the color space data (S218).

The above processing is repeatedly performed until no data is delivered from the RIP 106 (S204).

Figure 5:
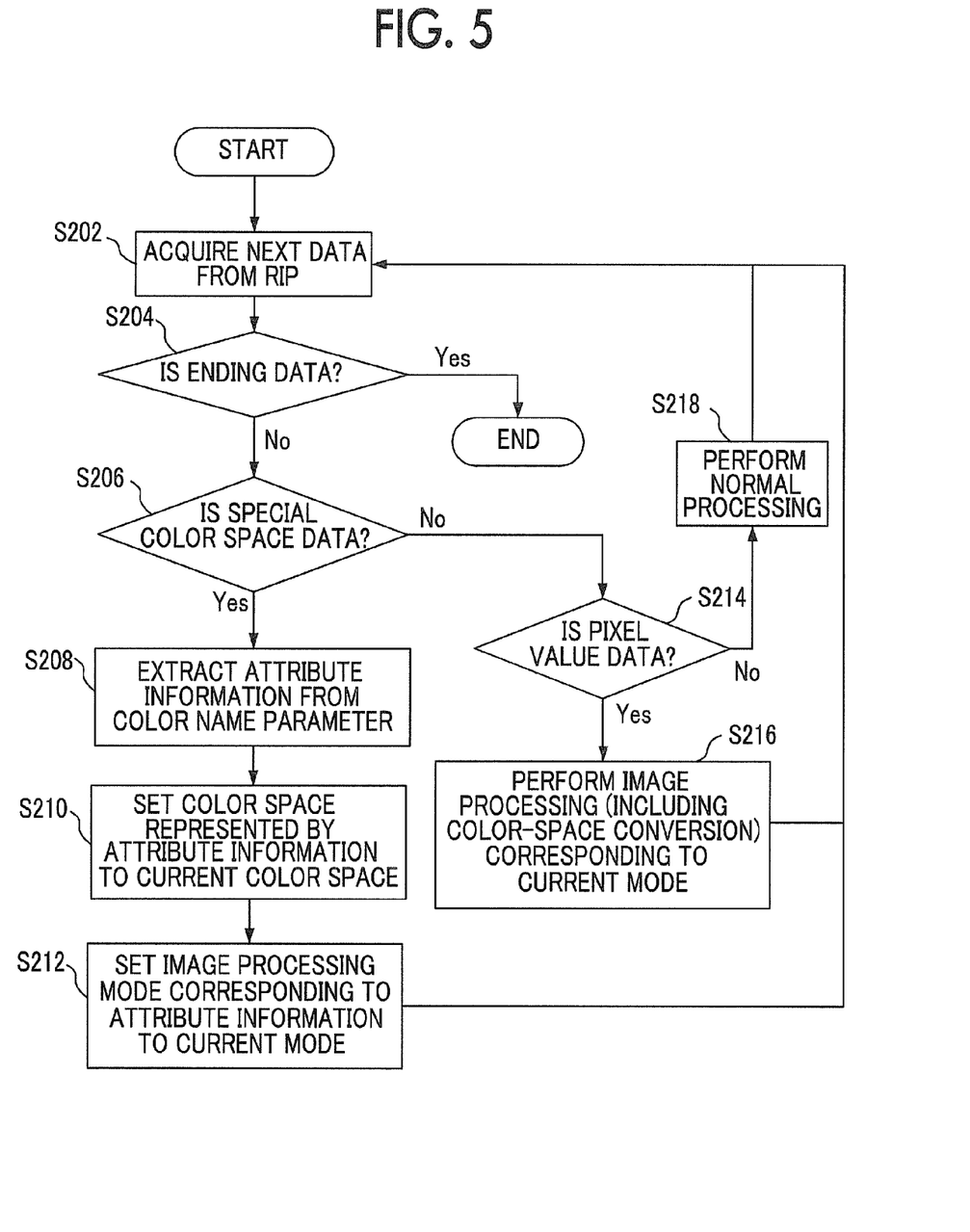
FIG. 5 is a diagram illustrating an example of the flow of the processing of a color converting unit in the exemplary embodiment.

In the processing flow of FIG. 5, the RIP 106 sends the color space data to the color converting unit 108 whenever a color space designating command is discovered from the PDL data 20. When the RIP 106 sends the color space data for each pixel to the color converting unit 108, the color converting unit 108 does not need to store the current color space or the current mode, the processes of steps S206, S208, and S216 may be executed for each pixel.

Next, another example will be described with reference to FIG. 6. In this example, a device having the same configuration as FIG. 1 may be used. However, the content of the processing executed by the PDL rewriting unit 104 and the color converting unit 108 is different from that of the examples of FIGS. 2 and 3.

In this example, the PDL rewriting unit 104 interprets each page 30 (hereinafter referred to as an "actual page" in order to distinguish the same from a tag page described later) of input PDL data and generates a PDL description of a tag page 50 based on the interpretation result.

Here, the tag page 50 is one page of raster image data in which each pixel has a pixel value corresponding to the attribute information of an image object to which the pixel belongs.

Figure 6:
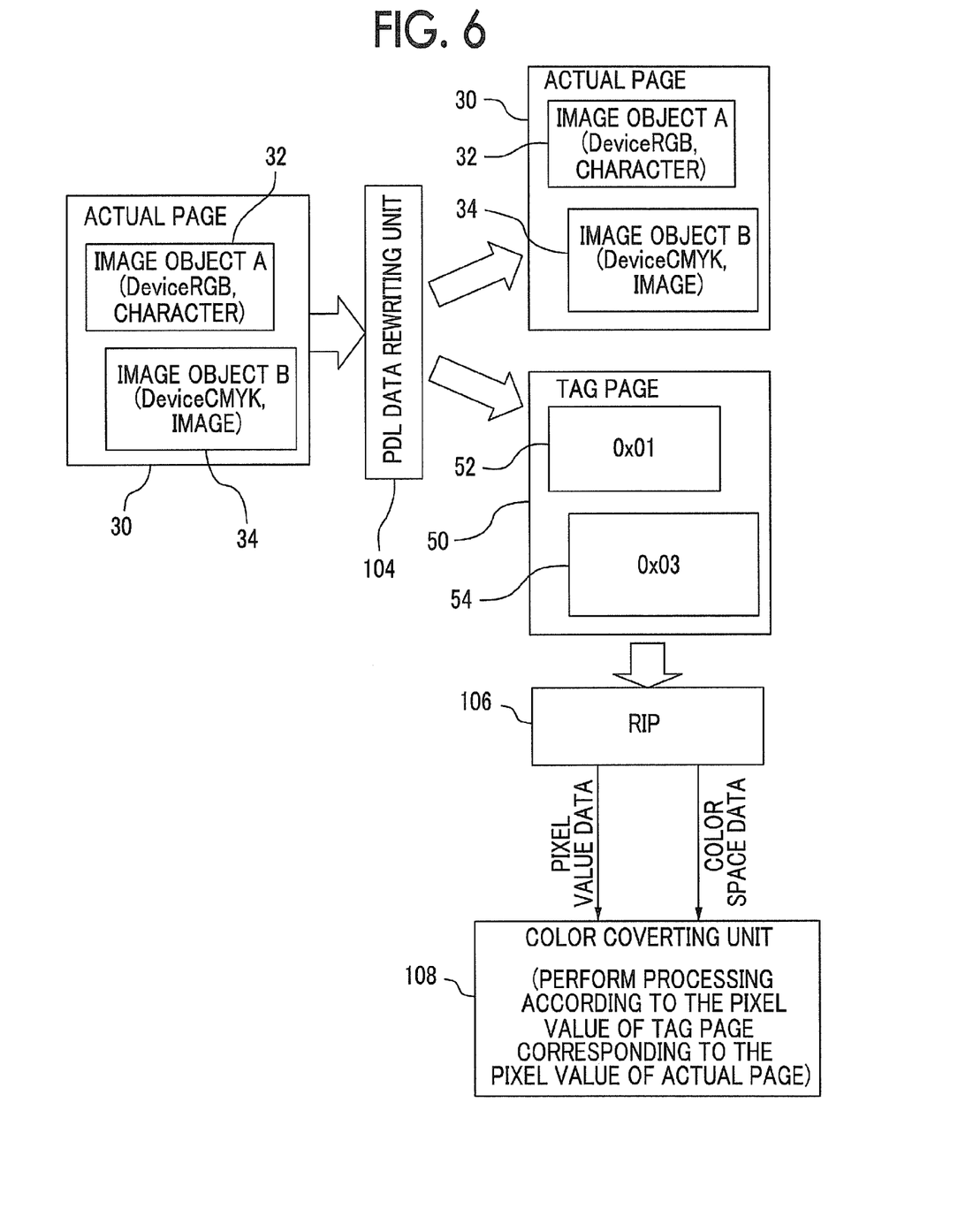
FIG. 6 is a diagram for explaining another example.

In the example of FIG. 6, the actual page 30 includes an image object A32 of which the color space attribute is DeviceRGB and the type is "character" and an image object B34 of which the color space attribute is DeviceCMYK and the type of "image". In the tag page 50 corresponding to the actual page 30, a group of pixels 52 belonging to the image object A32 has a pixel value 0x01 (0x represents a hexadecimal number) representing a combination of a color space attribute "DeviceRGB" and an object type attribute "character". Moreover, in the tag page 50, a group of pixels 54 belonging to the image object B34 has a pixel value 0x03 (0x represents a hexadecimal number) representing a combination of a color space attribute "DeviceCMYK" and an object type attribute "image". The tag value such as 0x01 is only an example.

The PDL rewriting unit 104 obtains the attribute information (a color space attribute, an object type attribute, and the like) of an image object in the actual page 30 and a group of pixels belonging to the image object from a PDL description of each of the image objects in the actual page 30. Moreover, the PDL rewriting unit 104 generates a PDL description that instructs so that the group of pixels in a page has a tag value corresponding to the attribute information thereof. Here, for example, the PDL description of the tag page 50 may use a command (for example, an "image" operator) that paints a raster image of the tag page 50 as an "image" and may use a command (for example, a "fill" operator) that fills a group of pixels included in the region of each of image objects in a page with a tag value corresponding to the attribute information of the object.

Moreover, the PDL rewriting unit 104 inserts the PDL description of the tag page 50 generated in this way in the source PDL data. This inserting may be realized by a method such that the generated PDL description of the tag page 50 satisfies a predetermined correspondence with respect to the PDL description of the source actual page 30 in the PDL data after insertion. Here, for example, the correspondence may ensure that the PDL description of the tag page 50 is located right before (or right after) the PDL description of the actual page 30, for example. Here, for example, "right before" the actual page 30 is a position between the end of a PDL description of one page before, of the actual page 30 and the start of the PDL description of the actual page 30 itself. The "right before (or right after)" is only an example, and the PDL description of the actual page 30 and the PDL description of the corresponding tag page 50 may be arranged by an order corresponding to the correspondence in the PDL data after rewriting. The correspondence between the actual page 30 and the tag page 50 is the common knowledge with the color converting unit 108 and is also registered in the color converting unit 108.

As described above, the rewriting performed by the PDL rewriting unit 104 may be a process of rewriting the PDL data of the source actual page 30 into the pair of PDL data of the actual page 30 itself and the tag page 50.

In this way, the PDL rewriting unit 104 adds the PDL description of the tag page to all pages included in the source PDL data. In this way, the rewritten PDL data in which the tag page is added is input to the RIP 106.

The RIP 106 executes normal RIP processing on the received rewritten PDL data sequentially from the start. In this way, the raster images of the respective actual pages 30 represented by the PDL data and the respective corresponding tag pages 50 are generated in an order corresponding to the correspondence described above. During the RIP processing, the RIP 106 delivers the values of the respective pixels obtained by the RIP processing to the color converting unit 108 and sends a request for color-space conversion to the color converting unit 108.

The color converting unit 108 identifies the raster image of the tag page 50 in accordance with the registered correspondence and recognizes the attribute information of the image object, to which the respective pixels of the corresponding actual page 30 belong, in accordance with the values (that is, tag values) of the respective pixels on the raster image. Moreover, the color converting unit 108 executes image processing corresponding to the recognized attribute information with respect to the respective pixels of the actual page 30.

For example, when the PDL rewriting unit 104 inserts the PDL description of the tag page 50 right before the PDL description of the actual page 30, the color converting unit 108 recognizes that odd pages input from the RIP 106 are the tag page 50. The raster images of the odd pages are stored in a memory. When performing image processing such as color-space conversion on the respective pixels of the next even pages (that is, actual pages), the color converting unit 108 selects the processing content corresponding to the pixel value (that is, a tag value, which represents attribute information) of the corresponding pixel on the raster image (tag page) on the memory. Moreover, when the PDL rewriting unit 104 inserts the PDL description of the tag page 50 right after the PDL description of the actual page 30, the color converting unit 108 recognizes that the odd pages input from the RIP 106 are the actual page 30 and stores the values of the respective pixels of the actual page 30 in a memory. Moreover, upon receiving the values of respective pixels of the next even pages (that is, tag pages), the color converting unit 108 executes image processing (including color-space conversion) corresponding to the values (tag values) with respect to the value of the corresponding pixel on the image of the actual page 30 stored in the memory. Here, the image processing corresponding to the attribute information represented by the tag value is the same processing as the case of FIGS. 2 and 3.

In order to realize such processing, the color converting unit 108 may store the correspondence between the tag value and the image processing mode.

As above, in the example of FIG. 6, the PDL rewriting unit 104 disposed at the front stage of the RIP 106 inserts the PDL description of the tag page 50 representing the attribute information of the respective image objects in a page in the source PDL data so that the attribute information is delivered to the color converting unit 108 via the RIP 106 which does not have an extended function. In this example, since the attribute information is delivered to the color converting unit 108 via the tag page, the color space data that just represents a color space may be used in the same manner as the related art. In this case, the color space attribute within the attribute information of the image object may be delivered from the RIP 106 to the color converting unit 108 as normal color space data, and only the object type attribute included in the tag page may be delivered to the color converting unit 108.

The print server 100 illustrated hereinabove may be realized, for example, by causing a general-purpose computer to execute a program that represents the processing of the respective functional modules described above. Here, the computer has a circuit configuration in which a microprocessor such as a CPU, a memory (a primary storage) such as a random access memory (RAM) and a read only memory (ROM), an HDD controller for controlling a hard disk drive (HDD), various I/O (input/output) interfaces, a network interface for controlling the connection to a network such as a local area network, and the like are connected to each other as hardware via a bus, for example. A disk driver for performing reading and/or writing on a portable disk recording medium such as a CD or a DVD, a memory reader/writer for performing reading and/or writing on portable nonvolatile recording media of various standards such as a flash memory, and the like may be connected to the bus via the I/O interfaces, for example. The program in which the processing contents of the functional modules illustrated above are described is stored in a stationary storage device such as a hard disk drive via a recording medium such as a CD or a DVD or via communication unit such as a network and is installed in the computer. The program stored in the stationary storage device is read into the RAM and executed by a microprocessor such as a CPU whereby the functional modules illustrated above are realized. Part or all of these functional modules may be configured as a hardware circuit such as a special-purpose LSI (Large Scale Integration), an ASIC (Application Specific Integrated Circuit), or an FPGA (Field Programmable Gate Array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a rewriting unit that extracts attribute information of each image object from first page description language data and adds a special color space designating command including at least one color name parameter that represents the attribute information of each of the extracted image objects to rewrite the first page description language data into second page description language data;
an RIP unit that interprets the second page description language data rewritten by the rewriting unit to obtain each pixel value of printing image data for a printing device; and
a color converting unit that performs a color conversion process during the processing of the RIP unit, wherein
the rewriting unit and the color converting unit share information on the correspondence between a color space and a combination of color name parameters for expressing the color space, and
the rewriting unit adds a command which includes color name parameters by the same number as the number of colors in a color space of the image object designated in the first page description language data and which represents the attribute information of the image object by a combination of at least one of the color name parameters as the special color space designating command added for each image object, and the rewriting unit adds the command by extracting a description from a command description for designating color space attribute information of the image object.

2. The image processing device according to claim 1, wherein
the attribute information represented by the at least one color name parameter of the added special color space designating command includes information on a color space of the image object from first page description language data corresponding to the special color space designating command, designated in the first page description language data, and
the image processing executed by the image processing unit includes color-space conversion of the respective received pixel values from a color space represented by the received color name parameter to a color space of the printing device.

3. The image processing device according to claim 1, further comprising:
an image processing unit that performs image processing corresponding to the attribute information of an image object, to which a pixel indicated by a control image belongs, with respect to each of the pixels of an image other than the control image, among the images output from the image processing unit as the processing result.

4. An image processing device comprising:
a rewriting unit that extracts attribute information of each image object from first page description language data and adds a special color space designating command including at least one color name parameter that represents the attribute information of each of the extracted image objects to rewrite the first page description language data into second page description language data;
an RIP unit that interprets the second page description language data rewritten by the rewriting unit to obtain each pixel value of printing image data for a printing device; and
a color converting unit that performs a color conversion process during the processing of the RIP unit, wherein
the rewriting unit and the color converting unit share information on the correspondence between a color space and a combination of color name parameters for expressing the color space and the rewriting unit adds a command which includes color name parameters by the same number as the number of colors in a color space of the image object by extracting a description from a command description for designating color space attribute information of the image object,
the attribute information represented by the at least one color name parameter of the added special color space designating command includes information on a color space of the image object from first page description language data corresponding to the special color space designating command, designated in the first page description language data, and
an image processing executed by an image processing unit includes color-space conversion of the respective received pixel values from a color space represented by the received color name parameter to a color space of the printing device.

5. An image processing device comprising:
a rewriting unit that extracts attribute information of each image object from first page description language data and adds a special color space designating command including at least one color name parameter that represents the attribute information of each of the extracted image objects to rewrite the first page description language data into second page description language data;
an RIP unit that interprets the second page description language data rewritten by the rewriting unit to obtain each pixel value of printing image data for a printing device; and
a color converting unit that performs a color conversion process during the processing of the RIP unit, wherein
the rewriting unit and the color converting unit share information on the correspondence between a color space and a combination of color name parameters for expressing the color space, the rewriting unit adds a command which includes color name parameters by the same number as the number of colors in a color space of the image object by extracting a description from a command description for designating color space attribute information of the image object, and wherein the image processing device further comprises:
an image processing unit that performs image processing corresponding to the attribute information of the image object from first page description language data, to which a pixel indicated by a control image belongs, with respect to each of the pixels of an image other than the control image, among the images output from the image processing unit as the processing result.

* * * * *